May 25, 1965
T. F. KNAPP
3,185,910
MAGNETIC SWITCH-SCR FOR MOTOR SPEED CONTROL SYSTEM
Filed June 21, 1962
3 Sheets-Sheet 1
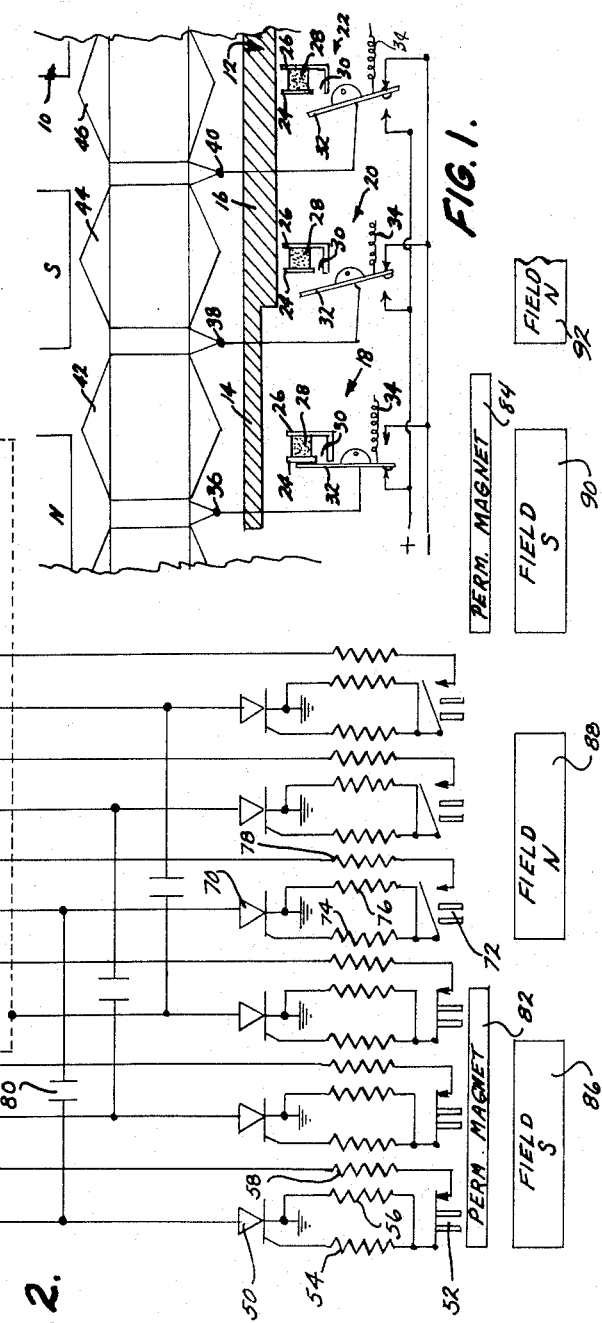
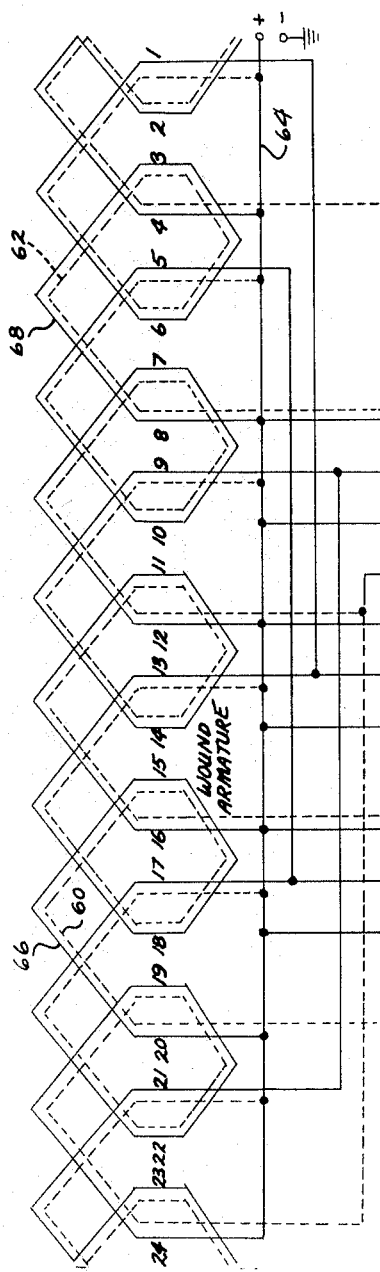
INVENTOR.
THEODORE F. KNAPP
BY *Price & Heneveld*
ATTORNEYS

INVENTOR.
THEODORE F. KNAPP
BY
ATTORNEYS

May 25, 1965  T. F. KNAPP  3,185,910
MAGNETIC SWITCH-SCR FOR MOTOR SPEED CONTROL SYSTEM
Filed June 21, 1962  3 Sheets-Sheet 3

United States Patent Office 3,185,910
Patented May 25, 1965

3,185,910
MAGNETIC SWITCH-SCR FOR MOTOR SPEED
CONTROL SYSTEM
Theodore F. Knapp, Grand Rapids, Mich., assignor to
Lear Siegler, Inc.
Filed June 21, 1962, Ser. No. 204,223
8 Claims. (Cl. 318—138)

This invention concerns brushless direct current motors, and more particularly motors in which the commutation of the windings is achieved at least in part by magnetic switches operated by the rotation of the motor itself.

One of the basic characteristics of direct current motors is that their windings have to be commutated, i.e. the polarity of the voltage supplied thereto periodically reversed, in order to make the motor run. Traditionally, commutation has been achieved by providing stationary brushes which ride on a rotating commutator and switch the polarity of the windings on the rotor shaft. A serious inherent disadvantage of this traditional construction is that the large motor currents being switched by the commutator cause arcing, wear of the brushes, and deterioration of the commutator which seriously affect the reliability of the motor in those scientific and industrial applications in which a direct current motor must run reliably without service for long periods of time.

Various ways have been devised to overcome this drawback, but they have all had one or more disadvantages, either because of their complexity or because of the starting and running characteristics they produce. The present invention approaches a more satisfactory solution of the problem in three steps: in a first step, it teaches the switching of stationary armature coils subjected to a rotating unswitched field by stationary magnetic switches operated by magnetic means on the rotor. In a second step, the invention uses the magnetic switches thus operated to merely trigger solid-state switching devices, so that the magnetic switches need handle only minute currents and consequently have a far longer contact life than would otherwise be possible. In a third step, the invention uses the magnetic switches only for triggering the solid-state switches during starting and then disables them as the motor approaches operating speed in order to transfer commutation of the motor entirely to the electronic circuitry and thus impose no wear at all on the magnetic switches while the motor is operating at normal speeds.

In addition to its basic purpose, the invention provides the additional advantages of making it possible, with only very minor circuitry changes, to either make the motor operate at a constant speed regardless of load, or to make it vary its speed in accordance with load. Inasmuch as the difference between the two modes of operation involves only circuit changes in physically stationary portions of the circuit, it is even possible to switch the same motor from one mode of operation to the other.

It is therefore an object of this invention to provide a direct current motor in which commutation of the windings is accomplished by simple magnetic means.

It is a further object of this invention to provide a direct current motor in which the windings are commutated by non-moving electronic devices which are triggered at very low current levels by magnetic switches operated in synchronism with the rotation of the motor.

It is a still further object of this invention to provide a direct current motor in which movable commutating means are used only for the starting of the motor, commutation control being transferred to electronic commutation means exclusively when the motor approaches operating speed.

These and other objects of this invention will become apparent from the following specification, taken in connection with the accompanying drawings in which:

FIG. 1 is a schematic development of a two-pole three-slot direct current motor showing the magnetic switching apparatus in accordance with this invention;

FIG. 2 is a schematic development of a four-pole twenty-four-slot direct current motor using the combined magnetic and solid-state switching means of this invention;

Figure 3:
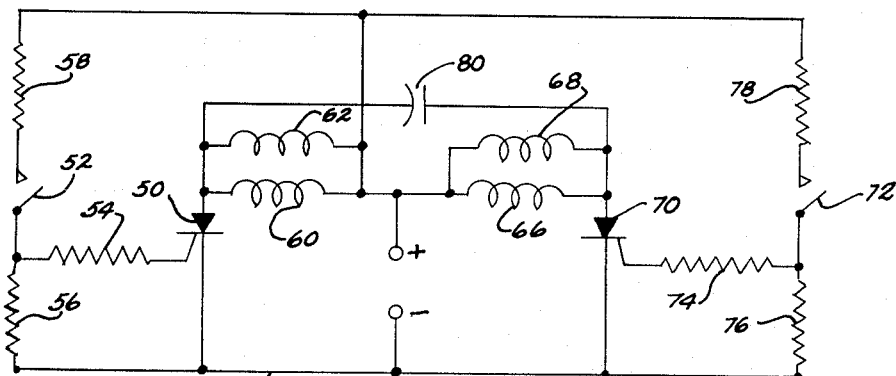
FIG. 3 is the equivalent circuit of one of the three identical sections of the circuit of FIG. 2.

Basically, the invention teaches the use of magnetic switches operated in synchronism with the rotation of a direct current motor to commutate its windings. In accordance with the invention, this is preferably accomplished by providing the rotor with a constant magnetic field produced either electrically or by permanent magnet means, and placing the windings and magnetic switches on the stator. The magnetic switch means are then operated by a constant magnetic field associated with the rotor and revolving with it.

In accordance with a further aspect of the invention, handling of high commutation currents by the magnetic switches is avoided by providing electronic switching means to switch the main winding currents, and using the magnetic switches only to trigger the electronic switching devices.

In accordance with a third aspect of the invention, the motor is provided with means for generating a separate voltage as a function of motor speed which is then used to disable the magnetic switches when the motor approaches operating speed, after which the triggering of the electronic devices is accomplished entirely by non-moving means.

In accordance with various embodiments of the invention, these non-moving means may consist either of induction means which generate an alternating current whose frequency is controlled by the speed of rotation of the motor, or of electronic circuitry using the oscillatory properties of a tank circuit to control the switching of the winding currents at a fixed frequency.

Referring now to the drawings, FIG. 1 shows a brushless direct current motor of the two-pole three-slot type in schematic development. The rotor includes the field 10 which may be created either by permanent magnets mounted on the rotor, or through an air gap by a fixed coil electrical winding supplied with direct current. The rotor also includes an annular piece of magnetically permeable material 12 which has a thin portion 14 and a thick portion 16 The magnetically permeable ring 12 is physically so disposed with respect to magnetic switches 18, 20, 22 mounted on the stator that when the thick portion 16 is adjacent one of the switches 18, 20, 22, it provides a path of low reluctance between points 24, 26 of the magnetic circuit of the switch, while when the thin portion 14 is opposite one of the switches 18, 20, 22, the reluctance between points 24, 26 of that switch is high. Each of the magnetic switches 18, 20, 22 comprises a permanent magnet 28 which normally creates a sufficiently strong magnetic flux through the gap 30 to attract the switch arm 32. However, when the thick portion 16 of the magnetically permeable ring 12 is adjacent the points 24, 26 of the magnetic circuit of the magnet 28, the magnetic flux is diverted through the ring 12, and the flux value at the gap 30 drops to a level insufficient to overcome the bias of spring 34. Consequently, as the portions 14, 16 of ring 12 pass by the magnetic switches 18, 20, 22, they move back and forth between their two extreme positions.

The switch arm 32 of each of the switches 18, 20, 22 is connected to one of the junctions 36, 38, 40 at which the stationary stator windings 42, 44, 46 are interconnected. An examination of the circuit connections shown in FIG. 1 will readily reveal that regardless of the position of the motor, there is always one winding energized in one direction, one winding energized in the other direction, and one winding not energized. Operation of the motor, of course, is based on the principle that a current-carrying conductor placed in a magnetic field will be subjected to a displacement force, and since the conductor is held stationary on the stator, the resulting force will cause the magnetic field on the rotor to rotate. In view of the above-stated switching condition, it will be seen that the motor is self-starting because there is always current flow in two of the windings regardless of the position of the motor.

Figure 6:
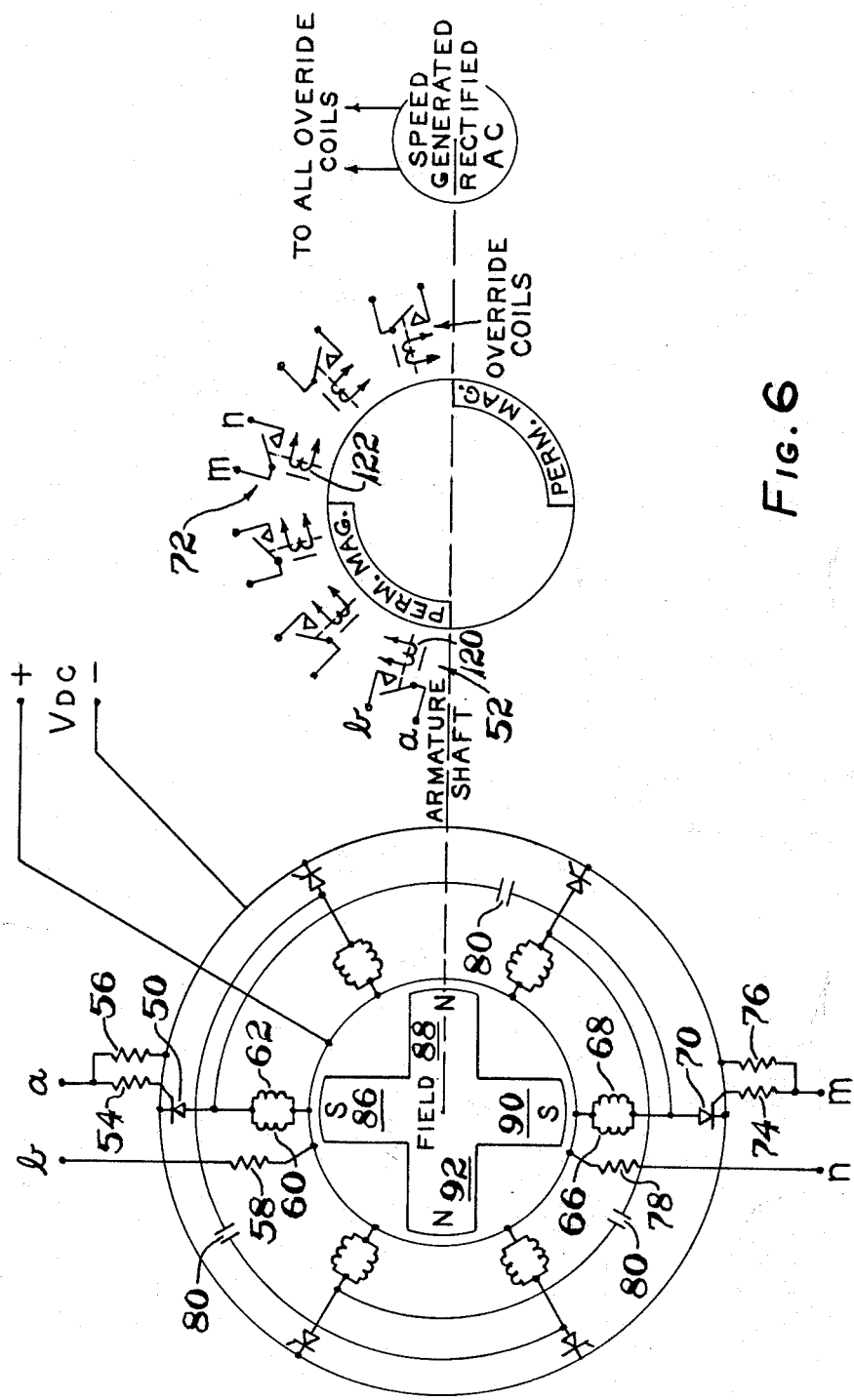
FIG. 6 is a schematic representation of the four-pole motor of FIG. 2 illustrating the operative relationship thereto of the motor windings and the override coils of FIG. 2.

Proceeding now to FIGS. 2 and 6, it will be seen that the schematic development shown therein represents a four-pole twenty-four-slot direct current motor. Just as the motor of FIG. 1 had three identical windings, the motor of FIG. 2 has three identical sections. A typical one of these sections consists of a solid-state switching device 50 triggered by a magnetic switch 52 through a limiting resistor 54 from a voltage divider network 56, 58; winding portions 60, 62 connected in parallel between the solid-state switch 50 and the positive bus 64; winding portions 66, 68 connected in parallel between positive bus 64 and solid-state switching device 70; a magnetic switch 72 for triggering the solid-state switching device 70 through limiting resistor 74 from a voltage divider network 76, 78; and a capacitor 80 connected across the anodes of the solid-state switching devices 50, 70. The magnetic switches 52, 72 are operated by the permanent magnets 82, 84, which are mounted on the rotor of the motor together with the field poles 86, 88, 90, and 92, as more clearly illustrated in FIG. 6.

The electrical circuitry involved can be presented in a simplified form in a diagram such as that shown in FIG. 3, in which the components corresponding to the various components of FIG. 2 are identified by like numerals. In FIG. 3, the ground connection is identified by the bus 94.

Figure 4:
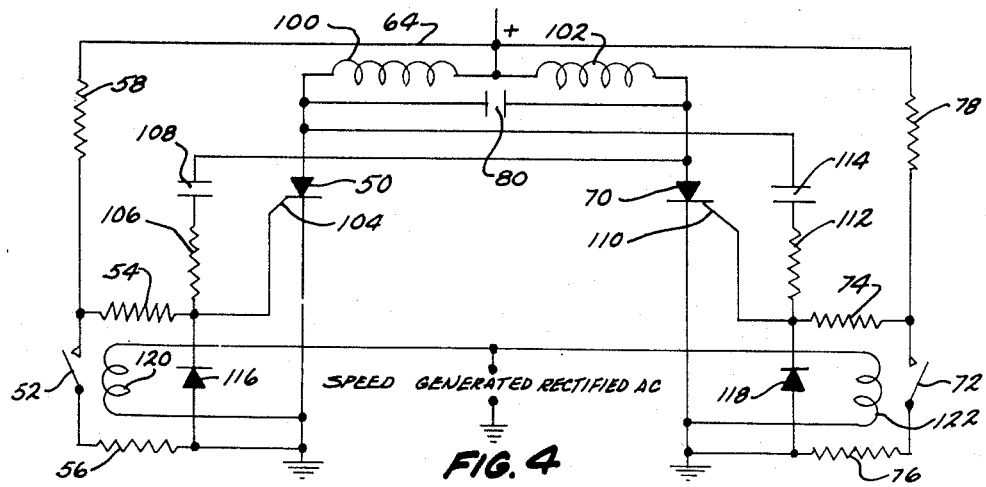
FIG. 4 is a wiring diagram of a single section similar to that of FIG. 3 but showing one method of fully electronic commutation at operating speeds.

Turning to FIG. 4, it will be seen that the diagram shown therein is basically the same as that of FIG. 3. In FIG. 4, however, the parallel-connected windings 60, 62 have been consolidated into a single winding 100, and the parallel-connected windings 66, 68 have been consolidated into a single winding 102. In addition, the control element 104 of the silicon controlled rectifier 50 has also been connected through a limiting resistor 106 and a D.C. blocking condenser 108 to the anode of silicon controlled rectifier 70. Likewise, the control element 110 of silicon controlled rectifier 70 is connected through a limiting resistor 112 and the D.C. blocking condenser 114 to the anode of silicon controlled rectifier 50. Also, diodes 116, 118 have been provided as surge protectors for the silicon controlled rectifiers 50, 70. The magnetic switches 52, 72 have been provided with override coils 120, 122 which are fed a speed-generated rectified A.C. voltage generated by the motor in a separate coil or coils and rectified by conventional means, to lock the magnetic switches closed when the motor speed exceeds a predetermined value.

Figure 5:
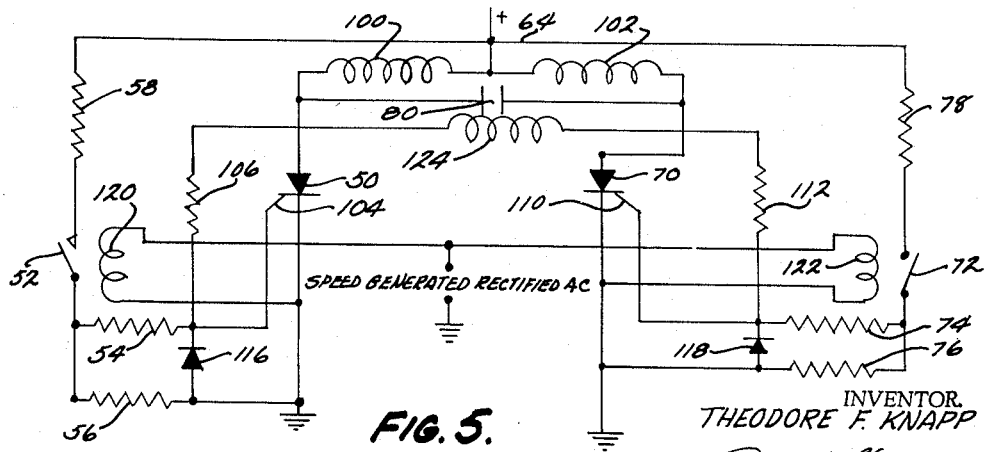
FIG. 5 is a diagram similar to FIG. 4 but showing a different method of fully electronic commutation at operating speeds.

The device of FIG. 5 is in most respects identical to the device of FIG. 4, except that the position of the magnetic switches 52, 72 on the positive side of the limiting resistor 54, 74 makes it necessary to lock them open rather than closed by means of the override coils 120, 122. Also, in the device of FIG. 5, the signal applied to the control elements 104, 110 through the limiting resistors 106, 112 is generated as a separate alternating voltage in a special coil or coils 124 which makes the D.C. blocking capacitors unnecessary because the voltage generated in coil 124 does not contain any direct current components.

*Operation*

The operation of the circuit of FIG. 3 is as follows: assuming that the motor has come to rest in a position in which the permanent magnet 82 (FIG. 2) closes switch 52 but leaves switch 72 open, the energization of the direct current power supply 64–94 will cause a potential positive with respect to bus 94 to appear at the control element of silicon controlled rectifier 50. The value of this potential is determined by the relationship of the voltage divider resistors 56, 58. In any event, the potential at the control element of silicon controlled rectifier 50 being positive with respect to its cathode, and a positive voltage being applied to the anode of rectifier 50 through coils 60 and 62, the silicon controlled rectifier 50 will fire and draw current through coils 60, 62. However, no current will be drawn through coils 66, 68 because with switch 72 open, the control element of silicon controlled rectifier 70 is at cathode level and the silicon controlled rectifier 70 cannot conduct.

In this condition, the silicon controlled rectifier 50 is essentially a closed switch, and the silicon controlled rectifier 70 is essentially an open switch. It will therefore be seen that the left side of capacitor 80 is substantially at the potential of negative bus 94, whereas the right side of capacitor 80 is substantially at the potential of positive bus 64. The current in the windings 60, 62 causes the motor to turn, and eventually this rotation will cause switch 52 to open. This has no effect on the circuit because once fired, the silicon controlled rectifier will continue to conduct until its anode is made negative with respect to its cathode. A short time later, the rotation of the motor will cause switch 72 to close. This causes silicon controlled rectifier 70 to fire for the reasons previously described in connection with the silicon controlled rectifier 50, and the potential of the right side of capacitor 80 thereupon immediately drops to the level of negative bus 94. However, since the left side of capacitor 80 has been charged negatively with respect to its right side, this results in the application to the anode of silicon controlled rectifier 50 of a potential substantially lower than that of negative bus 94. The silicon controlled rectifier 50 thereupon immediately ceases to conduct, and current flow through windings 60, 62 stops. The current flow through windings 66, 68, which is in the opposite direction from that which took place through the windings 60, 62, continues to turn the motor until the permanent magnet 84 calls for the next field reversal. The same process then repeats itself in order to switch back from silicon controlled rectifier 70 to silicon controlled rectifier 50, and thus the motor operates as long as direct current power is supplied to buses 64, 94.

The circuit of FIG. 4 functions in much the same manner as the circuit of FIG. 3. However, instead of absolute control of the firing of rectifiers 50, 70 by the switches 52, 72, firing control is now transferred to electronic means after the motor reaches a certain speed. At low speeds, the speed generated rectified A.C. voltage applied to the coils 120, 122 is not sufficient to impair the operation of the magnetic switches 52, 72, and the device functions in the same manner as that of FIG. 3. At this point, the voltages applied to the control elements 104, 110 through resistors 106, 112 are of sufficiently low magnitude to be overridden by the control signals generated by the operation of switches 52, 72. When the motor gets up to speed, however, the speed generated rectified A.C. voltage applied to coils 120, 122 becomes sufficiently large to lock the switches 52, 72 in their closed position. The potential now applied to control elements 104, 110 is, in effect, an alternating voltage generated at the anode of the opposite silicon controlled rectifier, superimposed upon a D.C. reference level determined by the relationship of voltage divider resistors 56, 58. The net effect of this arrangement is that the firing of the silicon controlled rectifiers 50, 70 is tied to the voltage swings on the two sides of the capacitor 80. Since the capacitor 80 and the windings 100, 102 constitute a tank circuit, the motor will have a tendency to stabilize its speed at a harmonic of the tank circuit frequency and hold it there regardless of load. The motor is thus self-synchronizing, and its synchronized speed can be adjusted by varying the capacity of capacitor 80. It should be noted that in this circuit, the choice of the D.C. blocking capacitors 108, 114 can be fairly critical because of the spurious firing effects which their own oscillatory properties may introduce.

A more satisfactory mode of operation in cases where constant speed is not essential is shown in FIG. 5. The functioning of this circuit is identical to that of FIG. 4, except that when the switches 52, 72 lock open, the voltage applied to the control elements 104, 110 is substantially the alternating voltage produced in coil 124, superimposed upon a D.C. ground potential. Actually, only the positive half cycles of the voltage generated by coil 124 appear at control elements 104, 110 because the diodes 116, 118 hold the control elements at ground potential whenever the output of limiting resistors 106, 112 drops below ground level.

It will be seen that the present invention provides an effective, inexpensive brushless direct current motor capable of extremely long life and high reliability. Other types of magnetic switching devices or triggerable transconductive devices may be substituted for the magnetic reed switches and silicon controlled rectifiers shown herein, without departing from the spirit of this invention. Obviously, the invention can be carried out in many different ways, and I therefore do not desire to be limited by the embodiments shown or described, but only by the scope of the following claims.

I claim:

1. A brushless direct current motor, comprising: a winding; solid-state switch means connecting said winding to a source of direct-current power; said solid-state switch means controlling the current flow in said winding; magnetic switch means connected to said solid-state switch means to control their operation below a predetermined motor speed; and means for disabling said magnetic switch means when the speed of said motor exceeds a predetermined value.

2. A brushless direct current motor, comprising: a center-tapped winding; said center tap being connected to one pole of a source of direct current; a pair of solid-state switch means connecting the ends of said winding to the other pole of said direct current source and controlling current flow through said windings; a pair of magnetic switch means each connected to the control element of one of said solid-state switch means and to a source of direct current potential for closing said solid-state switch means; means interconnecting said solid-state switch means to open each when the other closes; means for actuating said magnetic switch means in synchronism with the rotation of said motor; and means for disabling said magnetic switch means when said motor reaches a predetermined speed.

3. The device of claim 2, in which said control elements of said solid-state switch means are interconnected by a coil so disposed that rotation of said motor generates therein an alternating current whose frequency is proportional to the speed of said motor.

4. The device of claim 2, in which the control element of each of said pair of solid-state switches is further connected through direct-current blocking means to the anode of the other solid-state switch.

5. A brushless direct current motor, comprising: a center-tapped winding; said center tap being connected to one pole of a source of direct current; a pair of solid-state switch means connecting the ends of said winding to the other pole of said direct current source and controlling current flow through said windings; a pair of magnetic switch means each connected between the positive pole of said direct current source and the control element of one of said solid-state switch means, said control elements being also connected through resistors to the negative pole of said direct current source; means for actuating said magnetic switch means in synchronism with the rotation of said motor; and means for holding said magnetic switch means closed when said motor reaches a predetermined speed.

6. A brushless direct current motor, comprising: a center-tapped winding; said center tap being connected to one pole of a source of direct current; a pair of solid-state switch means connecting the ends of said winding to the other pole of said direct current source and controlling current flow through said windings; a pair of magnetic switch means each connected between the negative pole of said direct current source and the control element of one of said solid-state switch means, said control elements being also connected through resistors to the positive pole of said direct current source; means for actuating said magnetic switch means in synchronism with the rotation of said motor; and means for holding said magnetic switch means closed when said motor reaches a predetermined speed.

7. The device of claim 2, in which said control elements of said solid-state switch means are interconnected by a source of alternating current.

8. The device of claim 7 in which said alternating current is generated by the rotation of said motor as a function of its speed.

References Cited by the Examiner

UNITED STATES PATENTS

| | | | |
|---|---|---|---|
| 2,492,435 | 12/49 | Ostline | 318—254 |
| 2,797,376 | 6/57 | Meade | 318—138 X |
| 3,025,443 | 3/62 | Wilkinson et al. | 318—138 |
| 3,077,555 | 2/63 | Fredrickson | 318—254 |
| 3,096,467 | 7/63 | Angus et al. | 313—138 |
| 3,109,971 | 11/63 | Welch et al. | 318—30 |

ORIS L. RADER, *Primary Examiner.*